Figure 1:
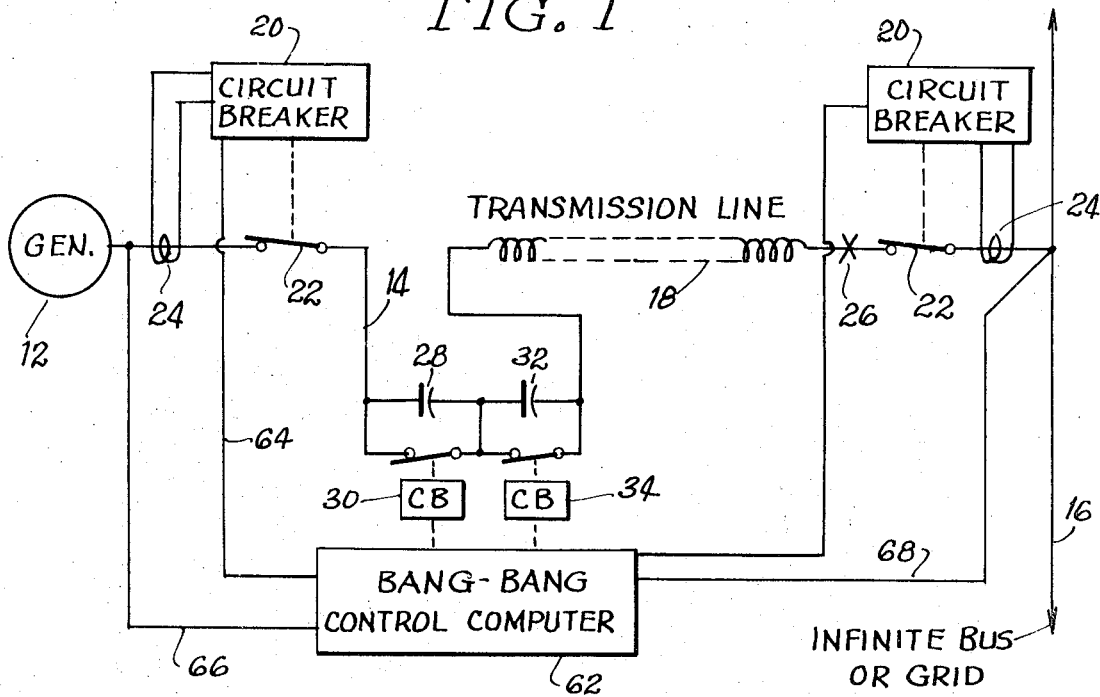

United States Patent

[11] 3,562,544

| | | |
|---|---|---|
| [72] | Inventors | Daniel K. Reitan;<br>Rama Rao Nagavarapu, Madison, Wis. |
| [21] | Appl. No. | 826,452 |
| [22] | Filed | May 21, 1969 |
| [45] | Patented | Feb. 9, 1971 |
| [73] | Assignee | Wisconsin Alumni Research Foundation<br>Madison, Wis.<br>a corporation of Wisconsin |

[54] METHOD AND APPARATUS FOR BANG-BANG CONTROL OF REACTANCE TO RESTORE STABILITY IN MINIMUM TIME IN A POWER SYSTEM INVOLVING TIE LINES
11 Claims, 5 Drawing Figs.

[52] U.S. Cl. .................................................. 307/85,
290/50, 307/52, 307/93
[51] Int. Cl. .................................................. H02j 1/00
[50] Field of Search .......................................... 307/85, 86,
87, 82, 84, 93, 43, 18, 92, 106, 107, 108, 112, 143,
56, 52, 53; 290/50; 317/5, (Inquired)

[56] References Cited
UNITED STATES PATENTS
1,935,292  11/1933  Griscom et al. ................ 307/85(X)
3,051,842  8/1962   Park ............................ 307/52

*Primary Examiner*—Robert K. Schaefer
*Assistant Examiner*—H.J. Hohauser
*Attorney*—Burmeister, Palmatier and Hamby ABSTRACT: The present invention restores a generator or generating station to its original condition of steady state equilibrium following a transient disturbance involving the momentary opening and subsequent reclosure of the circuit breakers in a tie line between the generator and a large power grid. Simultaneously with the reclosure of the breakers, a first capacitive reactance is connected in series with the line, to increase its power handling capability, so that the leading power angle of the generator will be reduced. Before the generator reaches its original power angle, an additional capacitive reactance is introduced in series with the line, to cause reverse power flow along the line, so that power is supplied to the generator by the grid. Thus, the generator is accelerated so that it returns to its original power angle and angular velocity. Both capacitive reactances are then short circuited or otherwise removed from the line so that the original condition of steady state equilibrium is restored.

INVENTORS
Daniel K. Reitan
RamaRao Nagavarapu
by Burmeister, Palmatier
and Hamby Att'ys

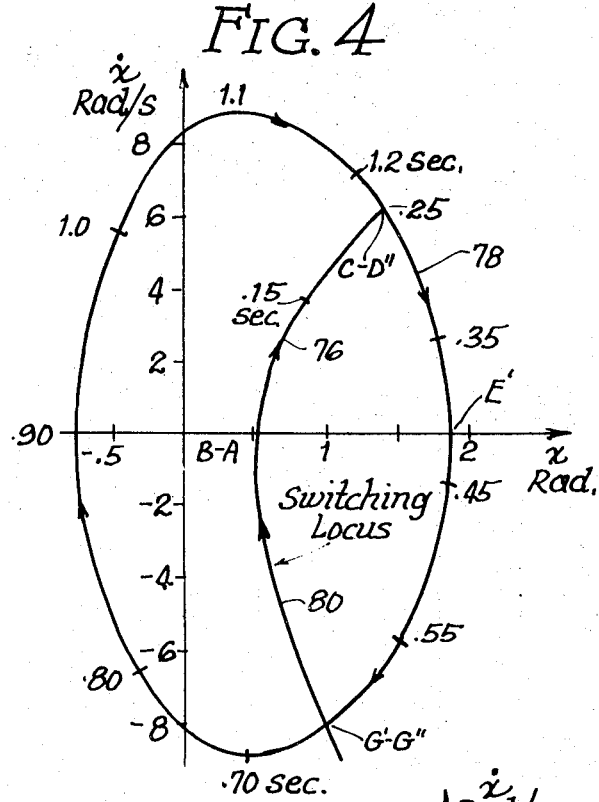
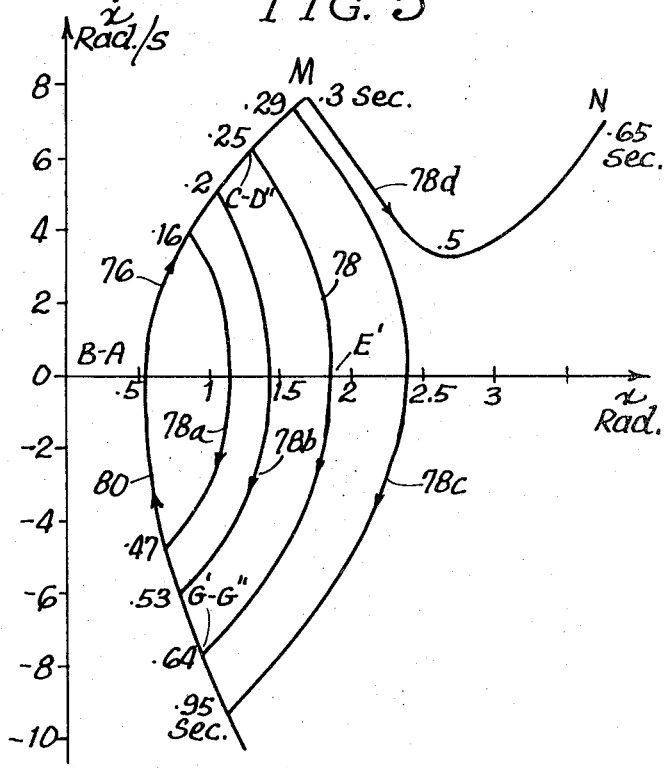

METHOD AND APPARATUS FOR BANG-BANG CONTROL OF REACTANCE TO RESTORE STABILITY IN MINIMUM TIME IN A POWER SYSTEM INVOLVING TIE LINES

This invention deals with the problem of restoring the stable synchronization of a power generator or a generating station after it has been disconnected momentarily from the associated power transmission system or grid by some momentary trouble in the transmission line which is employed to connect the generator to the transmission system. Such trouble may take the form of a momentary ground or short circuit due to lightning or any other cause. The ground or short circuit causes excess current, with the result that the circuit breakers are tripped open. It is the established practice to employ circuit breakers which automatically reclose as soon as possible so as to minimize the interval of disconnection. However, during such interval, the synchronization of the generator is upset to a greater or lesser extent, depending upon the length of the interval. The disconnection causes the generator to be accelerated, because the electrical power output of the generator drops to zero momentarily, while the mechanical power input remains unchanged. When the generator is reconnected to the transmission line, the power angle of the generator is greater than its previous steady state value. The generator must be decelerated so that both its angular velocity and power angle are brought back to the original condition of stable equilibrium. In the prior practice, the restoration of stability was always accompanied by considerable hunting of the generator. Moreover, in cases of severe instability, the synchronization of the generator was sometimes lost completely. Hereafter the word "generator" is used to mean an isolated generating station or a group of generating stations with one or more synchronous machines. The words "transmission line" mean long transmission lines including tie lines.

The present invention provides a bang-bang method of restoring the stability of the generator in minimum time, so that certain carefully timed switching operations are effective to return the generator to its original steady state operating point, with no hunting. Those skilled in the art will understand that a "bang-bang" control is one in which a transition is achieved by a series of maximum changes in one or more control variables.

In accordance with the present invention, a first capacitive reactance is switched or otherwise introduced in series with the transmission line or tie line, simultaneously with the reclosure of the circuit breakers. This capacitive reactance neutralizes some of the inductive reactance of the transmission line, so that the power transmitting capability of the line is increased. Thus, the generator is rapidly decelerated by the increased power transmitted from the generator to the system by the transmission line. The deceleration reduces the velocity of the generator rotor, so that a condition is reached at which the velocity deviation is zero, but the power angle of the generator is still advanced. The deceleration is continued, in order to correct the advance of the power angle. Before the power angle is brought back to its original value, an additional capacitive reactance is switched or otherwise introduced in series with the transmission line so that the net reactance of the transmission line becomes capacitive rather than inductive. This results in a reversal of the flow of power along the transmission line, so that power is supplied to the generator by the transmission line. As a result, the generator is driven as a motor and is reaccelerated. By the time that the power angle of the generator has been restored to its original value, the velocity deviation of the generator has also been restored to its original zero level. Thus, the original steady state operating point is restored without hunting. At this point, both capacitive reactances are short circuited or otherwise removed from the line, so that the original line conditions are restored. The restoration to the steady state operating point, as described above, is achieved in minimum time. Hereafter the words "phase angle" or "power angle" refer to the instantaneous deviation of the rotor angle from a synchronously revolving reference axis. The words "velocity" of "angular velocity of the rotor" refer to the instantaneous deviation of the angular velocity of the rotor from its value at synchronous speed.

The apparatus of the present invention preferably comprises a computer which times the switching operations so that the bang-bang control of line reactance is completely effective.

Further objects and advantages of the present invention will appear from the following description, taken with the accompanying drawings, in which:

FIG. 1 is a schematic diagram of an illustrative power distribution system to which the present invention is applied;

FIG. 2—5 are graphs illustrating the bang-bang control operations of the present invention.

As a illustrative embodiment of the present invention, FIG. 1 shows a power transmission system comprising a generator or generating station 12, connected by means of a transmission line 14 to an infinite bus or grid 16. It will be understood that the grid 16 is typically of very great size, including many other generators of much greater total generating capacity than that of the generator 12. Moreover, the grid 16 comprises a great many electrical consumers, utilizing a much greater amount of power than that generated by the generator 12. Thus, the electrical conditions on the infinite bus or grid 16 are not appreciably changed by changes in the generator 12 and the transmission line 14.

The reactance of the transmission line 14 is normally inductive. The inductive reactance is indicated as an inductance 18 in series with the line 14.

The illustrated transmission line 14 is protected by the circuit breakers 20 including breaker contacts 22 in series with both ends of the line. The breakers 20 include current sensing coils 24 adapted to trip open the breaker contacts 22 if excessive current occurs in either end of the transmission line 14, or the breakers 20 may incorporate some other suitable circuitry to detect abnormal conditions on the transmission line 14 to trip open the breaker contacts 22. The circuit breakers 20 are of the automatic reclosing type. Thus, the breaker contacts 22 will be reclosed as soon as possible after being tripped open, hoping that the abnormal conditions on the transmission line 14 have cleared.

The breakers 20 may be tripped open by a fault anywhere along the transmission line 18. In most cases, the fault is of a momentary character. Thus, a momentary ground or short circuit may be caused by a lightning bolt, striking the transmission line. There are many other causes of momentary grounds and short circuits. Such a momentary fault is indicated at 26.

When the circuit breakers 20 are tripped open for a brief interval, the generator 12 is momentarily disconnected from the infinite bus or grid 16. This momentary disconnection causes acceleration of the generator rotor, because the electrical power output of the generator drops to zero, while the mechanical power input remains unchanged. The excess mechanical power is converted into kinetic energy, so that the velocity of the rotor is increased slightly. When the circuit breakers 20 are reclosed, the phase angle of the generator 12 is advanced, relative to that of the grid 16. Moreover, the velocity of the generator rotor is greater than normal.

To bring about a rapid deceleration of the generator 12, a first capacitive reactance is introduced in series with the transmission line 14, simultaneously with the reclosure of the circuit breakers 20. Various arrangements may be utilized to provide this capacitive reactance. As shown by way of example in FIG. 1, the capacitive reactance is provided by a first capacitor 28, connected in series with the transmission line 14, and adapted to be short circuited by a circuit breaker 30. The reactance of the capacitor 28 is sufficient to neutralize a part of the inductive reactance of the transmission line 14. Thus, the line 14 is given a net inductive reactance which is substantially reduced. Accordingly, the power transmitting capability of the transmission line 14 is substantially increased. Thus, an increased amount of power is transmitted from the generator 12 to the grid 16 by the transmission line 14. This increased power is derived from the kinetic energy of the generator rotor, so that the generator is rapidly decelerated. At first, the power angle of the generator continues to increase, because the velocity of the generator rotor is still above normal. However, a point is reached at which the deceleration is sufficient to reduce the velocity deviation to the prior normal value of zero. This represents the point of maximum advance of the generator power angle. The deceleration of the generator is continued, in order to bring the power angle back to its original value. This tends to have the result of causing the rotor to swing and ultimately to settle at the steady state equilibrium point after several swings.

Before the generator power angle is brought back to normal, an additional capacitive reactance is introduced into the transmission line 14. In the illustrated embodiment, the additional reactance is provided by a second capacitor 32, adapted to be short circuited by a circuit breaker 34. The capacitor 32 is in series with the line 14 and the first capacitor 28. It will be understood that the first and second capacitors 28 and 32 are introduced into the line 14 by opening the circuit breakers 30 and 34.

The additional capacitive reactance provided by the second capacitor 32 is of a sufficient magnitude to neutralize the inductive reactance of the transmission line 14 completely, while also providing a net capacitive reactance, preferably equal in magnitude to the previous inductive value. The effect of the additional capacitive reactance is to reverse the flow of power along the transmission line 14, so that the infinite bus or grid supplies power to the generator 12. Thus, the generator 12 is driven as a motor and is accelerated. In this way, the velocity of the generator rotor is brought back to its original value of zero, at the same time as the power angle of the generator is brought back to its original angle. Both capacitive reactances are then removed from the transmission line 14, so that the line conditions are returned to the original state. The capacitive reactances are removed by closing the circuit breakers 30 and 34 so as to short the capacitors 28 and 32.

The timing of the switching operations is important, in order to achieve complete restoration of stability by the bang-bang method. The timing of the first breaker 30 is easy, because it is opened simultaneously with the closure of the circuit breakers 20. The opening of the second breaker 34 is timed to occur in accordance with the power angle of the generator, approximately halfway between the angle of maximum advance and the original angle as defined by equation (1) below. Thus, the deceleration of the generator accumulated between the angle of maximum advance and the opening of the breaker 34 will be offset by the acceleration of the generator between the opening of the breaker 34 and the restoration of the original power angle. Both of the breakers 30 and 34 are reclosed when the original phase angle is restored.

Figure 2:
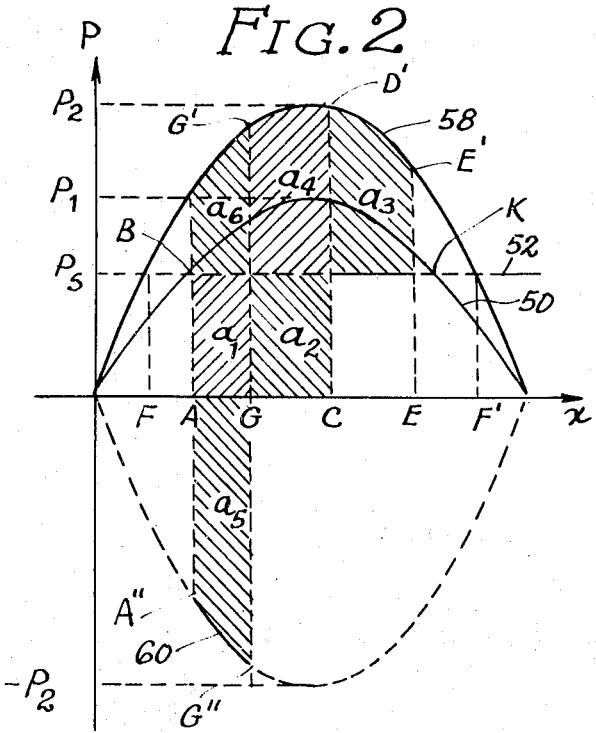

The restoration of stability is graphically illustrated in FIG. 2, which shows the characteristic curves of the transmission line 14 for the various switching conditions. In FIG. 2, the transmitted power P is plotted along the vertical axis, while the power angle $x$ of the generator is plotted along the horizontal axis. The normal characteristics of the transmission line 14 are represented by a sine type curve 50. The initial power $P_S$ delivered by the generator 12 to the transmission line 14 is represented by a horizontal line 52, spaced above the horizontal axis. The peak power of the curve 50 is designated $P_1$. It will be noted that the generator power level $P_S$ is substantially less than $P_1$. There are two intersections B and K between the horizontal line 52 and the curve 50. The first intersection B represents a condition of stable equilibrium and is the initial operating point. The other intersection K represents a condition of unstable equilibrium and is not used in operation. The generator power angle corresponding to the initial operating point B is designated A, along the horizontal axis.

During the interval of disconnection, due to the momentary opening of the circuit breakers 20, the generator power angle is advanced along the horizontal axis of the graph in FIG. 2, because the transmitted power is zero. The point C represents the power angle of the generator when the circuit breakers are reclosed. The exact location of this point depends upon the speed with which the circuit breakers are reclosed. The first capacitor 28 is simultaneously introduced in series with the transmission line 14. The capacitive reactance neutralizes a portion of the inductive reactance of the transmission line, so that the power transmission characteristic of the line is enlarged. The new power transmission characteristic is represented by a sine type curve 58 in FIG. 2. It will be seen that this curve is higher than the original curve 50. The new maximum power $P_2$ is greater than the original maximum power $P_1$.

Beginning with the point C, the generator is decelerated, but the power angle continues to advance to the point E, at which the velocity and kinetic energy of the generator are normal, but the power angle is at its point of maximum advance. Between the points C and E, the power transmitted by the line 14 follows the upper curve 58 between the points D' and E'. The angle E must be kept less than the point represented by $F_1$ which is the maximum extent to which the power angle can be advanced without losing synchronism.

The deceleration of the generator is continued with the result that the generator power angle decreases along the upper curve 58 to the point G', whereupon the second capacitor 32 is introduced in series with the transmission line 14. The net reactance of the transmission line 14 is thus made capacitive, with the result that the power transmission characteristic is shifted to a point G" on a negative curve 60, as shown in FIG. 2. The capacitor 32 is such that the curve 60 is an exact reversal of the curve 58. The negative curve indicates that the flow of power along the transmission line 14 is reversed, so that the grid supplies power to the generator 12. At the point G", the power angle of the generator is still greater than normal but the velocity and kinetic energy are less than normal. Thus, the power angle continues to decrease, while the generator is being accelerated by the negative flow of power along the transmission line, whereby the generator is driven as a motor. The power angle G is chosen so that the generator is accelerated to the normal velocity and kinetic energy, simultaneously with the return of the generator power angle to its original value A. Between points G" and A", the transmitted power follows the lower curve 60. At the point A", both capacitors 28 and 32 are short circuited and thus effectively removed from the transmission line 14. Accordingly, the line conditions are restored to normal so that the operating point is returned to its initial position, at the intersection B between the power load line 52 and the normal characteristic curve 50. At this point, all conditions are normal, including the line condition, the generator phase angle, and the generator velocity. Thus, stability is completely restored, without any swinging.

The switching operations at the points C, G' and A" are preferably performed under the control of a computer 62, which may respond to information received from the circuit breakers 20 and telemetered information from the opposite ends of the transmission line 14. Thus, input links 64 are provided between the circuit breakers 20 and the computer 62. Another input link 66 is provided between the output of the generator 12 and the computer 62. This link provides information as to the phase angle of the generator at the sending end of the transmission line 14. Still another link 68 is provided between the receiving end of the transmission line 14 and the computer 62. This link provides information as to the phase angle of the grid 16.

It can be shown mathematically that the correct angle G can be determined from the angles A and C. The relationship is as follows:

(1) $$\cos G = \frac{(\cos A + \cos C)}{2}$$

Thus, the computer can determine the angle G by utilizing standard computation procedures.

Returning to FIG. 2, it will be understood that the acceleration of the generator between the points A and C is represented by the sum of the areas $2_1$ and $2_2$. These areas are between the power load line 52 and the horizontal axis. During the interval of disconnection, the power transmission characteristic is zero and thus is along the horizontal axis. The area $a_1$ is between the points A and G while the area $2_2$ is between the points G and C. The entire difference between the normal power level and the zero transmission level goes into the acceleration of the generator during this interval.

The deceleration of the generator between the points C and E is represented by the area $2_3$ between the upper characteristic curve 58 and the power load line 52. Inasmuch as the deceleration is equal to the acceleration at the angle of maximum swing, E, it will be evident that the following equation applied:

$$(2)\ a_1 + 2_2 = 2_3$$

When the generator 12 is being decelerated along the enlarged power characteristic curve 58 between the points E and G, the total kinetic energy loss by the generator is represented by the corresponding area between the curve 58 and the horizontal power line 52. This area comprises $a_3$ and $a_4$, as will be evident from FIG. 2. It will be seen that $2_3$ is between points or power angles E and C, while $a_4$ is between C and G. The subsequent acceleration of the generator along the negative power curve 60 between the points G and A is represented by the area between the horizontal line 52 and the lower curve 60. This area comprises the sum of $a_1$ and $a_5$, as shown in FIG. 2. It will be recalled that $a_1$ is the rectangular area bounded by the horizontal load line 52, the horizontal axis, and the vertical lines through the phase angles A and G. The area $a_5$ is disposed between the negative curve 60 and the horizontal axis.

Inasmuch as the deceleration between the angles E and G is the same as the acceleration between the angles G and A, the following equation applies:

$$(3)\ a_1 + a_5 = a_3 + a_4$$

From these equations, the following equation can be derived mathematically:

$$(4) \qquad \cos E = \cos C - \frac{P}{P_2} \frac{\pi}{180} (E - A)$$

where all the angles are expressed in degrees.

From this equation, the maximum phase angle E can be computed from the initial phase angle A and the phase angle C at which the circuit breakers are reclosed.

Equation (1) above, whereby the angle G can be computed, is also derived from the equal area equations (2) and (3).

It may be helpful to summarize the operation of the bang-bang control system as shown in FIG. 1. During normal operation, the contacts 22 of the circuit breakers 20 are closed so that the transmission line 14 transmits power from the generator or generating station 12 to the infinite bus or power grid 16. The circuit breakers 30 and 34 are closed so that the capacitors 28 and 32 are ineffective. Referring to FIG. 2, the initial operating point is at the intersection B between the horizontal load line 52 and the power transmission characteristic curve 50, at the generator power angle A.

If a momentary ground or short circuit develops on the transmission line 14, due to lightning or a fault, or any other cause the circuit breakers 20 are tripped open momentarily but are automatically reclosed after approximately ¼ second, in the typical case.

During the interval of disconnection, the power transmission characteristic drops to zero and thus is along the horizontal axis. The generator is accelerated, due to the excess of mechanical power input, so that the phase angle of the generator is advanced. The angle C represents the phase angle at which the circuit breakers are reclosed.

Simultaneously with the reclosure of the circuit breakers 20, capacitive reactance is cut into the transmission line 14 by opening the circuit breaker 30, so that the capacitor 28 is in series with the line. The switch 30 is opened by the bang-bang control computer 62, which senses that the circuit breakers have been tripped open and are reclosing. The capacitive reactance produces the enlarged transmission curve 58, along which the generator is decelerated between the phase angles C and E. The velocity and energy of the generator are restored to normal at this point, but the generator phase angle is at its point of maximum advance.

The deceleration of the generator is continued as the enlarged curve 58 is retraced from E to C and then to the phase angle G, where the computer 62 opens the switch 34 to introduce additional capacitive reactance in series with the transmission line 14. This additional reactance is provided by the capacitor 32 and is sufficient to give the transmission line a net capacitive reactance. The power transmission characteristic switches to the negative curve 60, so that the flow of power along the transmission line is reversed. Thus, the transmission line supplies power to the generator 12 from the infinite bus or grid 16 so that the generator is accelerated along the negative curve 60 between the angles G and A. This acceleration is sufficient to overcome the deceleration which occurred between the angles E and G. Accordingly, the generator is restored to its initial power angle and its initial kinetic energy and velocity at the angle A. The computer 62 then closes both circuit breakers 30 and 34 so that the capacitors are effectively removed from the transmission line 14. In this way, the line conditions are restored to normal.

It will be evident that the generator 12 is returned to a condition of stable equilibrium, in a minimum period of time and with no hunting. Thus, the disturbance on the transmission grid 16 is minimized. Moreover, longer interruptions of the transmission line can be handled without any danger that the generator will go completely out of synchronism with the transmission grid 16.

The circuit breakers 30 and 34 across the first and second capacitors 28 and 32 respectively may be similar to the circuit breakers 20. The first and second capacitors 28 and 32 need have only a very short time rating as they will be in series with the line for very short intervals of time. This consideration makes these capacitors less costly than conventional line-compensating series capacitors.

The control process of the present invention works for all load conditions. For particular values of first and second capacitors 28 and 32, the only difference with different loads is that the time to reach the equilibrium state will be different.

It can be shown mathematically that the power angle characteristic of the transmission system is given by the following formula:

$$(5) \qquad P = \frac{E_1 E_2}{X} \sin x$$

In this formula, P is the power transmitted by the line; $E_1$, the excitation voltage of the generator; $E_2$, the voltage at the infinite bus; X, the reactance of the line; and x, the power angle. It will be recognized that the characteristic curves 50, 58 and 60 of FIG. 2 are plots of this formula, for different values of the line reactance X.

The maximum values $P_1$ and $P_2$ of the transmitted power occur when the power angle x is 90° so that sin x is 1.0. Thus, the maximum power values are given by the following formulas:

$$(6) \qquad P_1 = \frac{E_1 E_2}{X_1}$$

$$(7) \qquad P_2 = \frac{E_1 E_2}{X_2}$$

In these formulas $X_1$ and $X_2$ are the effective values of the line reactance for the curves 50 and 58.

The values of the first and second capacitors 28 and 32 can be calculated as follows. Consider a numerical example. The generated voltage $E_1 = 1.0$ per unit. The infinite bus voltage $E_2 = 0.8$ per unit. The line reactance $X_L = 1.0$ per unit.

$$P_1 = \frac{(1.0 \times 0.8)}{1.0} = 0.8$$

per unit If the first capacitor 28 has a capacitive reactance equal to 0.2 per unit, the net inductive reactance of the line after its insertion is equal to (1.0 − 0.2) per unit. Thus $$P_2 = \frac{(1.0 \times 0.8)}{0.8} = 1.0$$

per unit The second capacitor 32, then, should be such that, when it is inserted in series with the line, the power characteristic should have a maximum value of $-P_2$. Thus it must change the line reactance from a previous value of +0.8 per unit to −0.8 per unit. Hence it should introduce a capacitive reactance of 1.6 per unit. The second capacitor 32, having a larger capacitive reactance, will have a smaller capacitance than the first capacitor 28.

If the transmission line has 100 ohms of inductive reactance, then the first capacitor 28 should have 20 ohms of capacitive reactance, and the second capacitor 32 should have 160 ohms of capacitive reactance. Thus the value of the second capacitor is governed by the value of the first capacitor. The first capacitor can be chosen after deciding the value of $P_2$.

It is important to realize that this control process does not produce any abnormal conditions in the power system when the reactance of the transmission or tie line becomes capacitive for a short interval of time. The power flow is reversed momentarily, but the voltages are unchanged, so that there is never an overvoltage condition.

It has already been indicated that the computer 62 times the opening and closing of the circuit breakers 30 and 34, whereby the first and second capacitors 28 and 32 are cut into and out of the series circuit with the transmission line 18, in such a manner as to achieve the optimum control performance. Instead of being responsive to the power angles $A$ and $C$ as previous discussed, the computer may be responsive to the initial power $P_S$ and the reclosure time interval between the opening and reclosing of the circuit breakers 20. As already indicated, this reclosure time is generally about one quarter of a second, but may vary to some extent.

When the circuit breakers 20 are tripped open due to a momentary fault, the generator or generators are accelerated so that the power angle $x$ is increased, as already discussed. It can be shown mathematically that the second derivatives of the power angle $x$, with respect to time, is caused to vary directly with the power transmission level $P_S$, existing when the circuit breakers are tripped open. A pertinent mathematical formula for the second derivatives of the power angle is as follows:

$$(8) \quad \frac{d^2 x}{dt^2} = \frac{\pi f}{H} P_S \frac{1}{(1 + \dot{x}/\omega_0)}$$

In this formula, $x$ is the power angle; $f$, the frequency; $H$, a constant representing the moment of inertia of the generator; $P_S$, the initial transmitted power; $\dot{x}$, the first derivative of the power angle; and $\omega_0$, the initial angular velocity. The term $\frac{\dot{x}}{\omega_0}$ is normally quite small and can be neglected for purposes of a qualitative presentation. However, it needs to be taken into account when accurate computations are to be made.

Upon the reclosure of the circuit breakers 20, the second derivative of the power angle is governed by a different formula, which can be shown mathematically to be as follows:

$$(9) \quad \frac{d^2 x}{dt^2} = \frac{\pi f}{H} \left( P_S - \frac{E_1 E_2}{X} \sin x \right) \frac{1}{(1 + \dot{x}/\omega_0)}$$

In this formula the symbols are the same as in formula (8), with the addition of $E_1$, representing the excitation voltage of the generator; $E_2$, the infinite bus voltage; and $X$, the line reactance.

Figure 3:
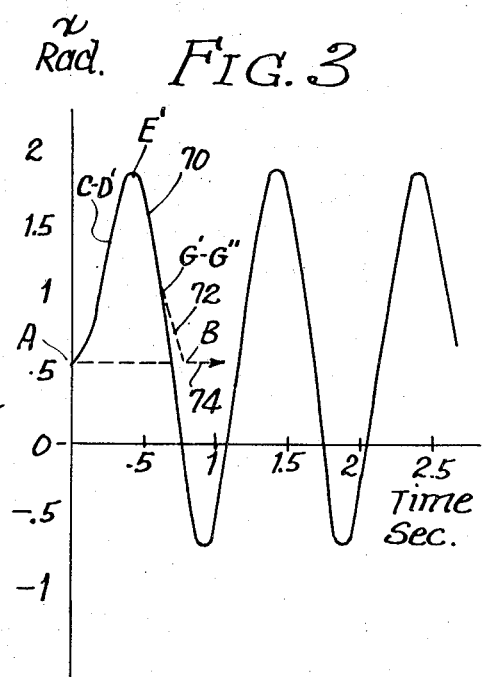

FIG. 3 is a graph representing the variation of the power angle $x$ against time. It comprises a curve 70, shown in full lines, which is a plot of the power angle $x$ against time, based on equations (8) and (9) above. The curve starts at zero time, at which the circuit breakers 20 are tripped open. At this time, the power angle is $A$, as previously indicated in connection with FIG. 2. In the example represented by FIG. 3, the circuit breakers 20 are reclosed after a time interval of 0.25 sec. During this interval, the power angle increases to the value $C$, as indicated in both FIGS. 2 and 3.

Upon the reclosing of the circuit breakers, the power angle characteristic jumps to the point D′, which, in the plot of FIG. 3, coincides with the point C. The power angle then swings to the maximum point E′, and begins to decrease along the sine type curve 70. Were it not for the bang-bang control of the present invention, the power angle would repeatedly swing back and forth, while following the sine-type curve. Eventually, the swinging of the power angle would be damped out, although the damping is not indicated in the idealized presentation of FIG. 3.

In accordance with the present invention, as already indicated, a second capacitor 32 is switched into the circuit, in series with the transmission line 18, at the ideal point G′, whereupon the power angle characteristic jumps to the point G″ on the negative power curve 60. In the plot of FIG. 3, the point G″ coincides with the point G′. From the point G″ in FIG. 3, the power angle $x$ follows the broken line curve 72 to the point B, whereupon both capacitors 28 and 32 are short circuited and thus are switched out of the circuit. At the point B, the power angle is at its original value A. Moreover, the initial state of stable equilibrium has been restored, so that the power angle stays along the horizontal line 74 through the power angle A.

FIG. 4 is a graph which is related to FIG. 3. However, FIG. 4 is a plot of $\dot{x}$ against $x$. Of course, $x$ is the power angle, while $\dot{x}$ is the first derivative of the power angle. Thus, $\dot{x}$ represents the angular deviation velocity of the power angle from its initial or nominal value.

In FIG. 4, the starting point is again the point A, the initial power angle. In this point, $\dot{x}$ is zero. When the circuit breakers are tripped open, both $x$ and $\dot{x}$ increase along a curve 76 to the point C, at which the circuit breakers are reclosed. This causes the power angle characteristic to follow a curve 78, from the point D″ toward the point E′. In the plot of FIG. 4, the point D″ coincides with the point C. Between the points D″ and E′, the angular deviation velocity $\dot{x}$ decreases, while the power angle $x$ increases to its maximum value. At the point E′, $\dot{x}$ is zero. Beyond the point E′, the power angle characteristic continues to follow the curve 78, but $\dot{x}$ goes negative, while $x$ decreases. The curve 78 is actually a closed loop, which would be traversed repeatedly by the power angle characteristic, were it not for the bang-bang control of the present invention. However, in accordance with the present invention, the power angle characteristic travels along the curve 78 only to the point G′, where the second capacitor 32 is switched into the circuit. In the plot of FIG. 2, the power angle characteristic jumps to the point G″, but the point G″ coincides with the point G′ in the plot of FIG. 4. The switching of the second capacitor into the circuit causes the power angle characteristic to travel along a different curve 80, directly back to the starting point A. In the plot of FIG. 4, the point A coincides with the point B, which is the target point in the plot of FIG. 2.

It will be recognized that the curve 80 is of the same type as the curve 78, but in a different location due to the change in the line reactance. Equation (9) is applicable to both curves 78 and 80. The only difference is in the value of the line reactance X.

From FIG. 4, it will be evident that the computer 62 can determine the optimum switching point G by simultaneously solving the equations for the curves 76, 78 and 80. Those skilled in the art will be able to program a computer to accomplish such a simultaneous solution.

FIG. 5 is a graph similar to FIG. 4, but showing the effect of varying the reclosure time interval, which is assumed to be 0.25 sec. in FIG. 4. FIG. 5 shows the same curves 76, 78 and 80 as in FIG. 4, for this reclosure time. However, only the most pertinent portion of the curve 78 is shown in FIG. 5.

In addition to the curve 78, FIG. 5 shows the corresponding curves 78a, 78b, 78c and 78d for other reclosure times, as follows:

| Curve | Reclosure Time-sec. |
|---|---|
| 78 | .16 |
| 78b | .2 |
| 78b | .25 |
| 78c | .29 |
| 78d | .3 |

It will be evident that the curves become larger with increasing closure time. All of the curves intercept the switching curve or locus 80, with the exception of the curve 78d, which represents a reclosure time greater than the maximum permissible time, for restoration of stable equilibrium. With the increasing values of reclosure time, the switching time at the point G' increases as follows:

| Reclosure time, sec. | Switching time, sec. |
|---|---|
| .16 | .47 |
| .2 | .53 |
| .25 | .64 |
| .29 | .95 |

The second switching time, when both capacitors 28 and 32 are switched out, also increases with increasing reclosure time, as follows:

| Reclosure time, sec. | Second switching time, sec. |
|---|---|
| .16 | .48 |
| .20 | .63 |
| .25 | .76 |
| .29 | 1.09 |

From this discussion, it will be evident that the computer 62 can readily be programmed to calculate the first and second switching times, for any particular value of the reclosure time.

It will be realized that the family of curves shown in FIG. 5 is for a particular value of $P_S$, the initial power level or load. A different family of curves will apply for each other value of $P_S$. However, the computer can readily be programmed to derive the first and second switching times, taking into account the variation of both $P_S$ and the reclosure time.

We claim:

1. A method of restoring a generator or a generating station to previous steady state equilibrium condition after momentary disconnection of the generator from a transmission line connected to an infinite bus or grid in minimum time:

said method comprising the steps of reconnecting the generator to the transmission line;

simultaneously introducing a first capacitive reactance in series with the transmission line to increase the power transmitting capability of the transmission line so as to cause increased loading on the generator to decelerate the generator and thereby overcome the acceleration which occurred during the interval of disconnection;

subsequently introducing additional capacitive reactance in series with the transmission line after substantial deceleration of the generator to reverse the power flow along the transmission line so that power is supplied to the generator by the transmission line to reaccelerate the generator; and removing the first capacitive reactance and the additional capacitive reactance from the transmission line when the generator has been restored to its original power angle and simultaneously reaccelerated to its original velocity and kinetic energy.

2. A method according to claim 1, in which said additional capacitive reactance is introduced into the transmission line before the phase angle of the generator has been restored to its initial angle.

3. A method according to claim 1, in which said first capacitive reactance is of a value to neutralize a portion of the inductive reactance of the transmission line.

4. A method according to claim 1, in which said additional capacitive reactance is of a value to neutralize completely the inductive reactance of the transmission line while also giving the transmission line a net capacitive reactance equal in magnitude to the net inductive reactance obtained by inserting in series with the line the first capacitive reactance.

5. A method according to claim 1, in which said first capacitive reactance is sufficient to neutralize a portion of the inductive reactance of the transmission line; and said additional capacitive reactance being sufficient to give the transmission line a net capacitive reactance.

6. Apparatus for restoring the stability of a generator following momentary disconnection of the generator from a transmission line leading to a power distribution system:

said apparatus comprising at least one circuit breaker connected in series with the transmission line for disconnecting and reconnecting the generator;

said circuit breaker being operative to disconnect the generator in response to any overload condition and being automatically operative to reconnect the generator after a brief interval;

a first capacitive reactance;

first means for selectively introducing and removing said first capacitive reactance in series with the transmission line;

a second capacitive reactance;

second means for selectively introducing and removing said second capacitive reactance in series with the transmission line;

and control means for operating said first means to introduce said first capacitive reactance in series with the transmission line simultaneously with the reclosing of said circuit breaker;

said first capacitive reactance being effective to increase the power transmitting capability of the transmission line so that the generator is rapidly decelerated to overcome the acceleration of the generator due to the momentary opening of the circuit breaker;

said control means being operative to cause said second means to introduce said second capacitive reactance in series with the transmission line after substantial deceleration of the generator but before the phase angle thereof is restored to normal so that the generator will be accelerated to its original velocity and kinetic energy simultaneously with the restoration of the original generator phase angle; and said control means thereupon being operative to cause said first and second means to remove said first and second capacitive reactances from the transmission line.

7. Apparatus according to claim 6, in which said first capacitive reactance is of a value to offset a portion of the inductive reactance of the transmission line.

8. Apparatus according to claim 6, in which said second capacitive reactance is of a value to give the transmission line a net capacitive reactance.

9. Apparatus according to claim 6:

in which said first capacitive reactance is of a value to offset a portion of the inductive reactance of the transmission line;

said second capacitive reactance being of a value to give the transmission line a net capacitive reactance.

10. Apparatus according to claim 6, in which said first and second capacitive reactances are provided by first and second capacitors connected in series with the transmission line.

11. Apparatus according to claim 10, in which said first and second means comprise circuit breakers connected across said first and second capacitors.

PO-1050
(5/69)

UNITED STATES PATENT OFFICE
CERTIFICATE OF CORRECTION

Patent No. 3,562,544  Dated February 9, 1971

Inventor(s) Daniel K. Reitan and RamaRao Nagavarapu

It is certified that error appears in the above-identified patent and that said Letters Patent are hereby corrected as shown below:

Column 5, line 1, Change "$z_1$ and $z_2$" to $-- a_1$ and $a_2 --$;

line 5, Change "$z_2$" to $--a_2--$;

line 10, Change "$z_3$" to $--a_3--$;

line 16, Change "$a_1 + z_2 = z_3$" to $--a_1 + a_2 = a_3$ line 23, Change "$z_3$" to $--a_3--$.

Column 7, lines 51 and 52, Change $\frac{d^2x}{dt^2} = \frac{\pi f}{H} P_s \frac{1}{(1+x/\omega_0)}$ to $-- \frac{d^2x}{dt^2} = \frac{\pi f}{H} P_s \frac{1}{(1+\dot{x}/\omega_0)} --$ Column 9, line 6, Change "78" to $--78a--$;

line 8, Change "78b" to $--78--$.

Signed and sealed this 13th day of July 1971.

(SEAL)
Attest:

EDWARD M. FLETCHER, JR.   WILLIAM E. SCHUYLER
Attesting Officer          Commissioner of Pat